US007248263B2

(12) United States Patent
Freeman et al.

(10) Patent No.: US 7,248,263 B2
(45) Date of Patent: Jul. 24, 2007

(54) USER INTERFACE FOR REPRESENTING MULTIPLE DATA SETS ON A COMMON GRAPH

(75) Inventors: Kenya Freeman, Morrisville, NC (US); Michael P Etgen, Cary, NC (US); W A Parvin, III, Fuquay-Varnia, NC (US)

(73) Assignee: International Business Machines Corporation, Armonk, NY (US)

(*) Notice: Subject to any disclaimer, the term of this patent is extended or adjusted under 35 U.S.C. 154(b) by 75 days.

(21) Appl. No.: 10/843,545

(22) Filed: May 10, 2004

(65) Prior Publication Data

US 2005/0248588 A1    Nov. 10, 2005

(51) Int. Cl.
*G06T 11/20* (2006.01)

(52) U.S. Cl. ............... 345/440; 345/440.1; 345/440.2; 345/661; 715/800; 715/815; 715/830; 715/859; 715/861; 715/866

(58) Field of Classification Search ............... 345/660; 715/800, 830, 812, 15, 824, 859, 861
See application file for complete search history.

(56) References Cited

U.S. PATENT DOCUMENTS

| 5,178,010 | A | | 1/1993 | Holzel |
| 5,307,455 | A | * | 4/1994 | Higgins et al. ............. 345/440 |
| 5,375,201 | A | * | 12/1994 | Davoust ..................... 715/503 |
| 5,462,438 | A | | 10/1995 | Becker et al. |
| 5,812,434 | A | | 9/1998 | Nagase et al. |
| 5,917,499 | A | * | 6/1999 | Jancke et al. ............... 345/440 |
| 5,949,976 | A | | 9/1999 | Chappelle |

(Continued)

FOREIGN PATENT DOCUMENTS

JP    57-117014    7/1982

(Continued)

OTHER PUBLICATIONS

Aitken, Peter; "SAMS Teach Yourself Microsoft Word 2000 in 10 Minutes," 1999, Sams Publishing, pp. 164.*

*Primary Examiner*—Kee M. Tung
*Assistant Examiner*—Antonio Caschera
(74) *Attorney, Agent, or Firm*—Bruce Clay; Rudolf O. Siegesmund; Gordon & Ress, LLP

(57) ABSTRACT

A method and user interface are provided for independently and conveniently scaling y-values of multiple data sets whereby the data sets may be plotted against a common y-axis and provide satisfactory variability. A multiplier is selected by which data points in a data set are multiplied, allowing plots of multiple data sets to be graphed against a common range of y-axis values. The initial multiplier may be calculated and selected automatically by the computer on which the graphing is performed or may be manually selected by a user. If the results of the graphing are not satisfactory to the user, the user may change the multiplier for any data set. A spin button may be provided to enable the user to easily increment or decrement a multiplier in pre-defined steps, such as by factors of 10. Additionally, a computer-generated indicator may be displayed to assist the user in selecting a different multiplier.

20 Claims, 6 Drawing Sheets

U.S. PATENT DOCUMENTS

| | | |
|---|---|---|
| 6,070,190 A | 5/2000 | Reps et al. |
| 6,381,635 B1 | 4/2002 | Hoyer et al. |
| 6,577,323 B1 * | 6/2003 | Jamieson et al. ........... 715/700 |
| 7,000,193 B1 * | 2/2006 | Impink et al. ............... 715/771 |
| 7,039,876 B2 * | 5/2006 | Lavendel et al. ........... 715/777 |
| 2003/0107581 A1 * | 6/2003 | Ritter et al. ................. 345/606 |

FOREIGN PATENT DOCUMENTS

| | | |
|---|---|---|
| JP | 07-334463 | 12/1995 |
| JP | 09-081112 | 3/1997 |

* cited by examiner

USER INTERFACE FOR REPRESENTING MULTIPLE DATA SETS ON A COMMON GRAPH

TECHNICAL FIELD

The present invention relates generally to the graphical display of information and, in particular, to the graphical display of multiple data sets, having varying scales, on a common graph.

BACKGROUND ART

A graphical format is commonly used to display data sets representing various types of information. It may also be very useful to be able to view multiple data sets on a single graph. If the dependent variables of the data sets (generally represented on the vertical or y-axis of a graph) share a common range, all of the data sets may easily be displayed. Frequently, however, the ranges of the dependent variables are such that, if the data sets are displayed on one graph, some points may be lost because they are beyond the maximum or minimum values of the common y-axis. Alternatively, some information may not be useful to a viewer because of insufficient variability within a data set as it is displayed on the graph. That is, the maximum and minimum values of the common y-axis may greatly exceed the maximum and minimum values in the range of data points. FIG. 1 illustrates examples of the foregoing conditions. In the Fig., the first plot 102 represents a data set having maximum and minimum y-values which fit within the maximum and minimum values of the y-axis scale (0-30) and also have sufficient variability relative to the y-axis scale as to provide meaningful information to a viewer. The second plot 104 has maximum and minimum y-values which fit within the maximum and minimum values of the y-axis scale. However, there is insufficient variability relative to the y-axis scale to provide meaningful information to a viewer. Finally, the third plot 106 has maximum and minimum y-values which exceed the range of maximum and minimum values of the y-axis scale and therefore information is lost to the viewer.

One method of resolving the conflict between two data sets having significantly different ranges of y values is to provide two y-axes, one on each side of the graph and each having a range of values appropriate to one of the data sets. It will be appreciated, however, that such a graph will not accommodate more than two data sets having significantly different ranges of y values.

Another method of resolving a conflict is to separately scale the y-values of the data sets and display the plots against a y-axis. Scaling has generally been performed automatically by the computer on which the data plots are to be displayed. As such, the scaling may not provide a "best fit" for the data points for the viewer's purposes. FIG. 2 illustrates an example of three data sets 202, 204 and 206 plotted on a single graph against a common y-axis; the plot is a screen shot from the Microsoft® Windows® Performance viewer. The data sets are automatically scaled 208. However, two of the plots 202 and 206 exceed the common y-axis range and the third, while fully within the y-axis range, displays only minimal variability relative to the y-axis range and may provide little useful information to the viewer.

Consequently, a need remains for the ability to conveniently graphically display multiple data sets, having varying y-value ranges, on a common graph.

SUMMARY OF THE INVENTION

The present invention provides a method and user interface for independently and conveniently scaling y-values of multiple data sets whereby the data sets may be plotted against a common y-axis and provide satisfactory variability. A multiplier is selected by which data points in a data set are multiplied, allowing plots of multiple data sets to be graphed against a common range of y-axis values. The initial multiplier may be calculated and selected automatically by the computer on which the graphing is performed or may be manually selected by a user. If the results of the graphing are not satisfactory to the user, the user may change the multiplier for any data set. A spin button may be provided to enable the user to easily increment or decrement a multiplier in predefined steps, such as by factors of 10.

Additionally, a computer-generated indicator may be displayed to assist the user in selecting a different multiplier. The indicator may tell the user that the resulting scaled values represent a best fit relative to the y-axis range of values, exceed the range or have an insufficient range. The user may then adjust the multiplier accordingly.

As a result, data sets having ranges of y-values which differ greatly may be conveniently plotted on the same graph against the same y-axis. The user may also adjust a multiplier to more clearly display the variability of y-values of a particular data set.

DETAILED DESCRIPTION OF THE PREFERRED EMBODIMENT

Figure 1:
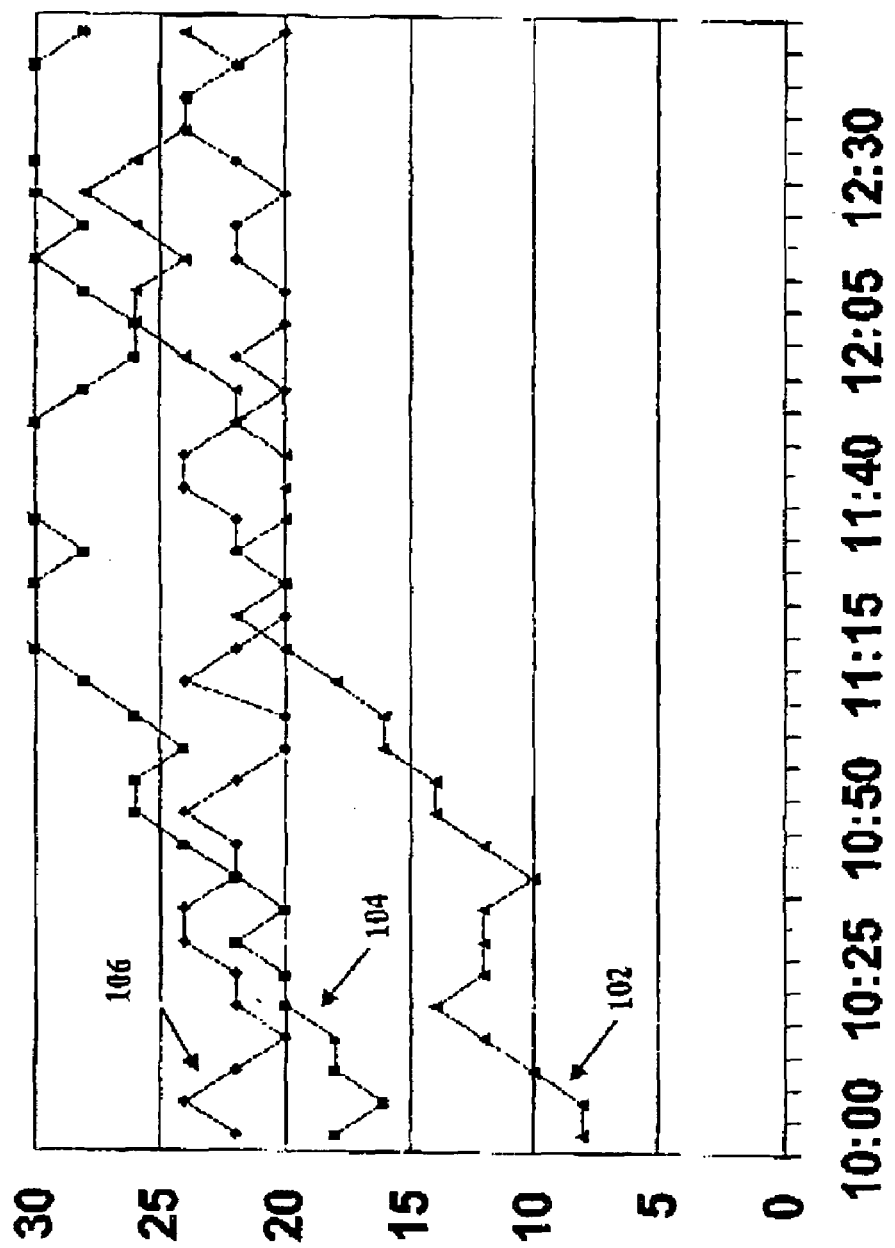
FIG. 1 illustrates plots of exemplary data sets having various y value ranges and plotted against a common y-axis.
Figure 2:
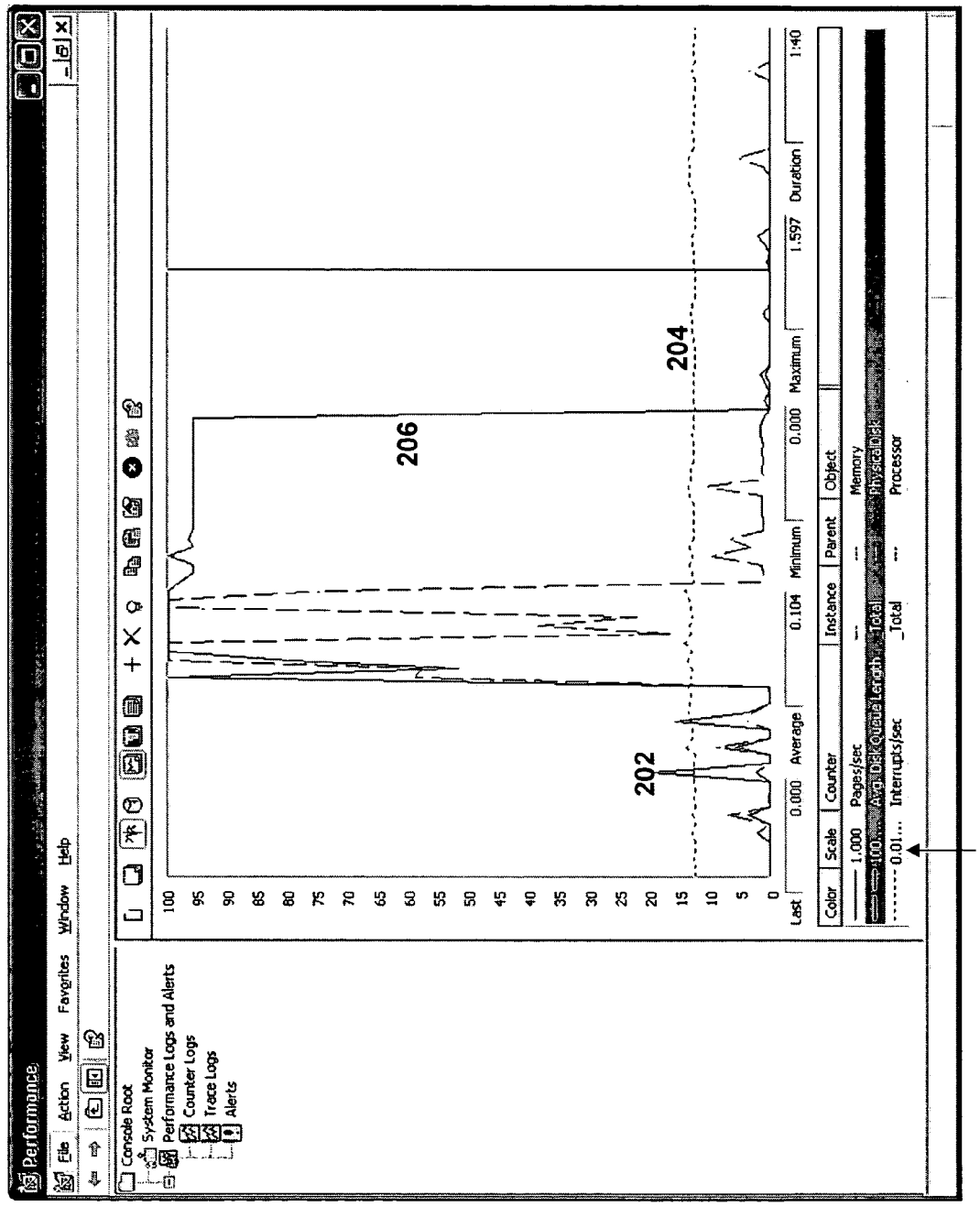
FIG. 2 illustrates plots of exemplary data sets having various automatically-scaled y value ranges and plotted against a common y-axis.
Figure 3:
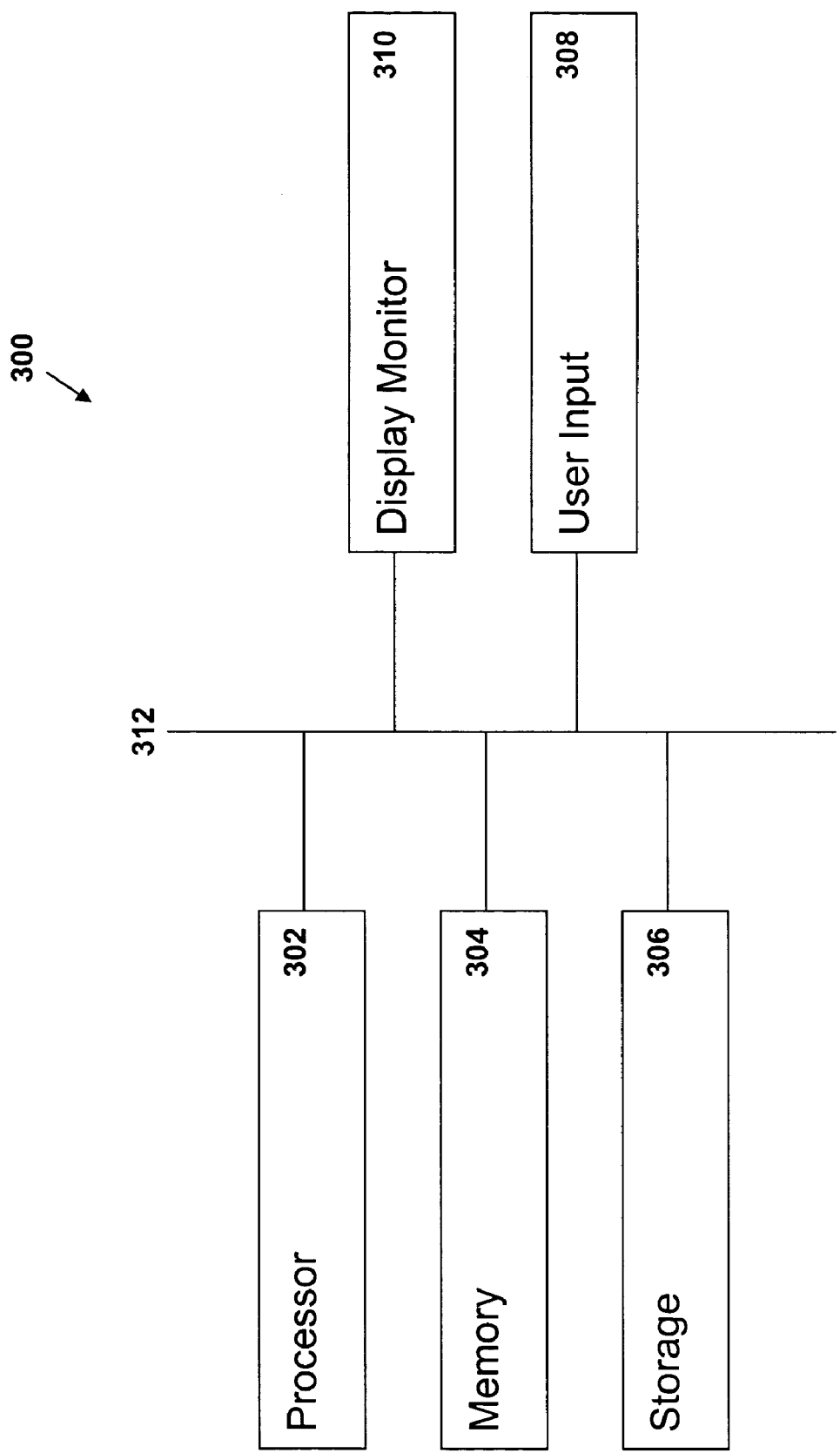
FIG. 3 is a block diagram of a computer system on which the present invention may be implemented.

FIG. 3 is a block diagram of a computer system 300 on which the present invention may be implemented. The computer system 300 includes a processor 302; memory 304; an internal or external storage device 306; a user input device 308, such as a keyboard and mouse; and a display monitor 310. The components 302-310 are interconnected through appropriate interfaces to a bus 312. It will be appreciated that the computer system 300 as illustrated is merely representative and the included components 302-310 are likewise representative and not meant to be exhaustive.

Figure 4:
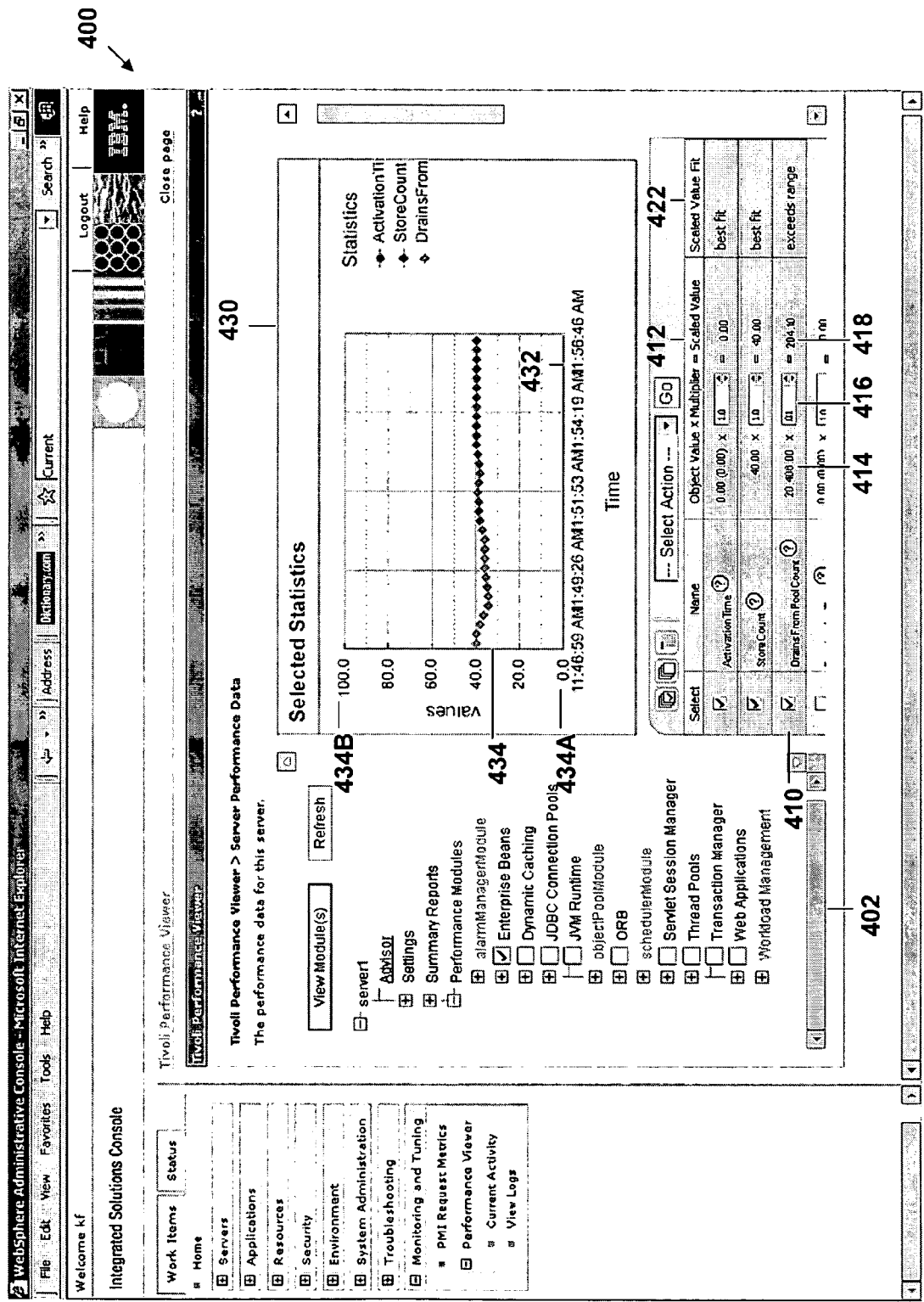
FIG. 4 is a first screen shot of a graph in which the present invention is being employed.

FIG. 4 is a screen shot of a graph in which the present invention is being implemented. A window 400 is displayed on the monitor 310. In the Fig., the window 400 displays information from the IBM® Tgivoli® Performance Viewer. In a first frame 402, a module whose performance is to be monitored is selected. In a second frame 410, various performance metrics are selected. And, in a third frame 430, the selected metrics are graphed. The graph 430 includes a horizontal (x) axis 432 representative of a common independent variable and a vertical (y) axis 434 representative of dependent variables. The vertical axis 434 includes a range of values between a minimum value 434A and a maximum value 434B. The y values chosen for display in FIG. 4 range from 0 to 100 although another range may also be chosen when appropriate.

In addition to displaying metrics for selection, the second frame 410 also includes a column 412 in which the maximum (original) value 414 in the data set of each metric and a user-selectable multiplier 416 are displayed. The scaled maximum value 418 is also displayed. In the Fig., three metrics have been selected for graphing. The data set for the first, "ActivationTime" has a maximum value of 4.00 and a multiplier of 0.10 has been selected resulting in a scaled maximum value of 0.40. The data set for the second metric, "StoreCount", has a maximum value of 40.00. A multiplier of 1.0 has been selected resulting in a scaled maximum value of 40.0. The data set for the third metric, "DrainsFromPoolCount", has a maximum value of 20,406.00. A multiplier of 0.01 has been selected resulting in a (rounded) scaled maximum value of 204.10.

Figure 5:
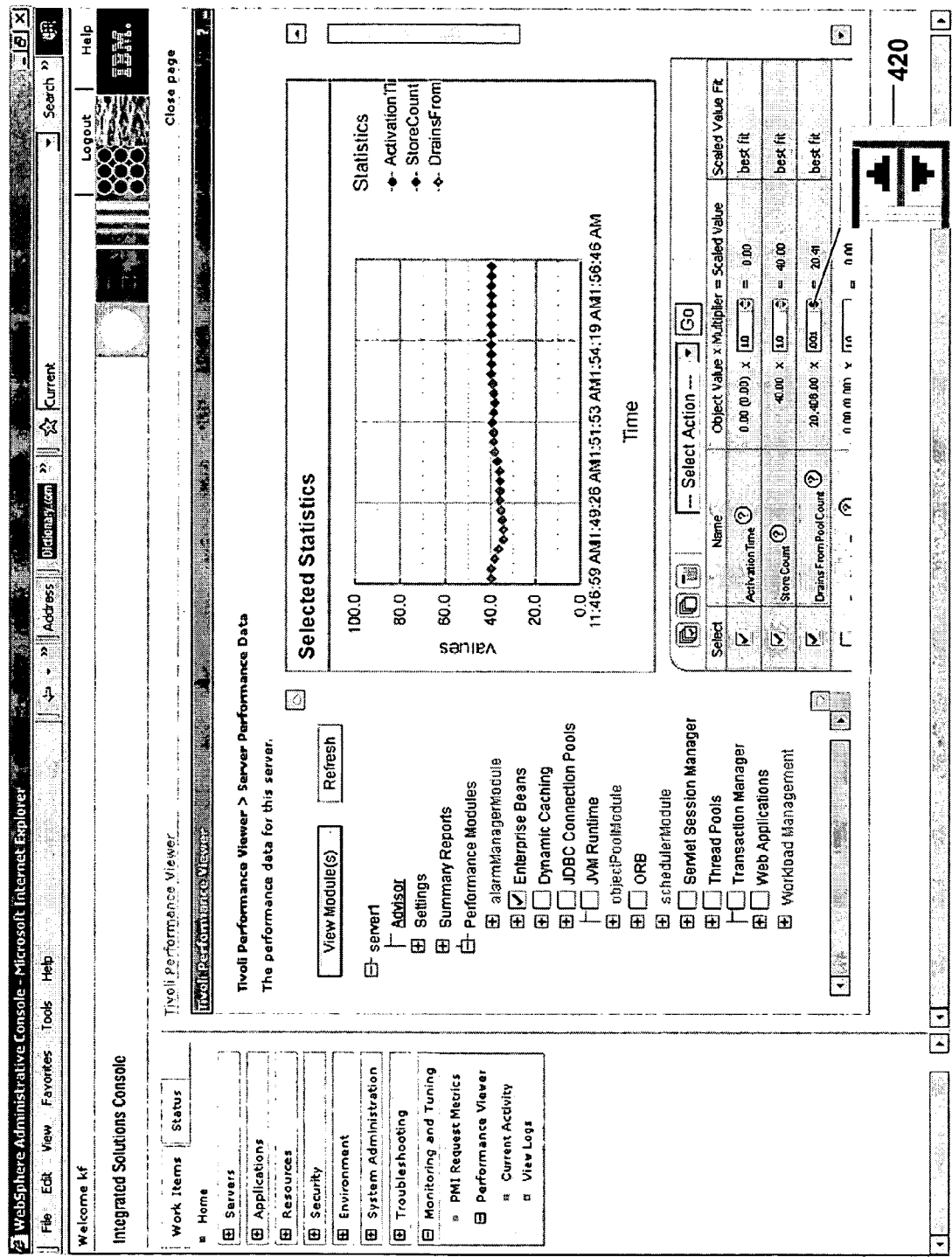
FIG. 5 is a second screen shot of a graph in which the present invention is being employed.
Figure 6:
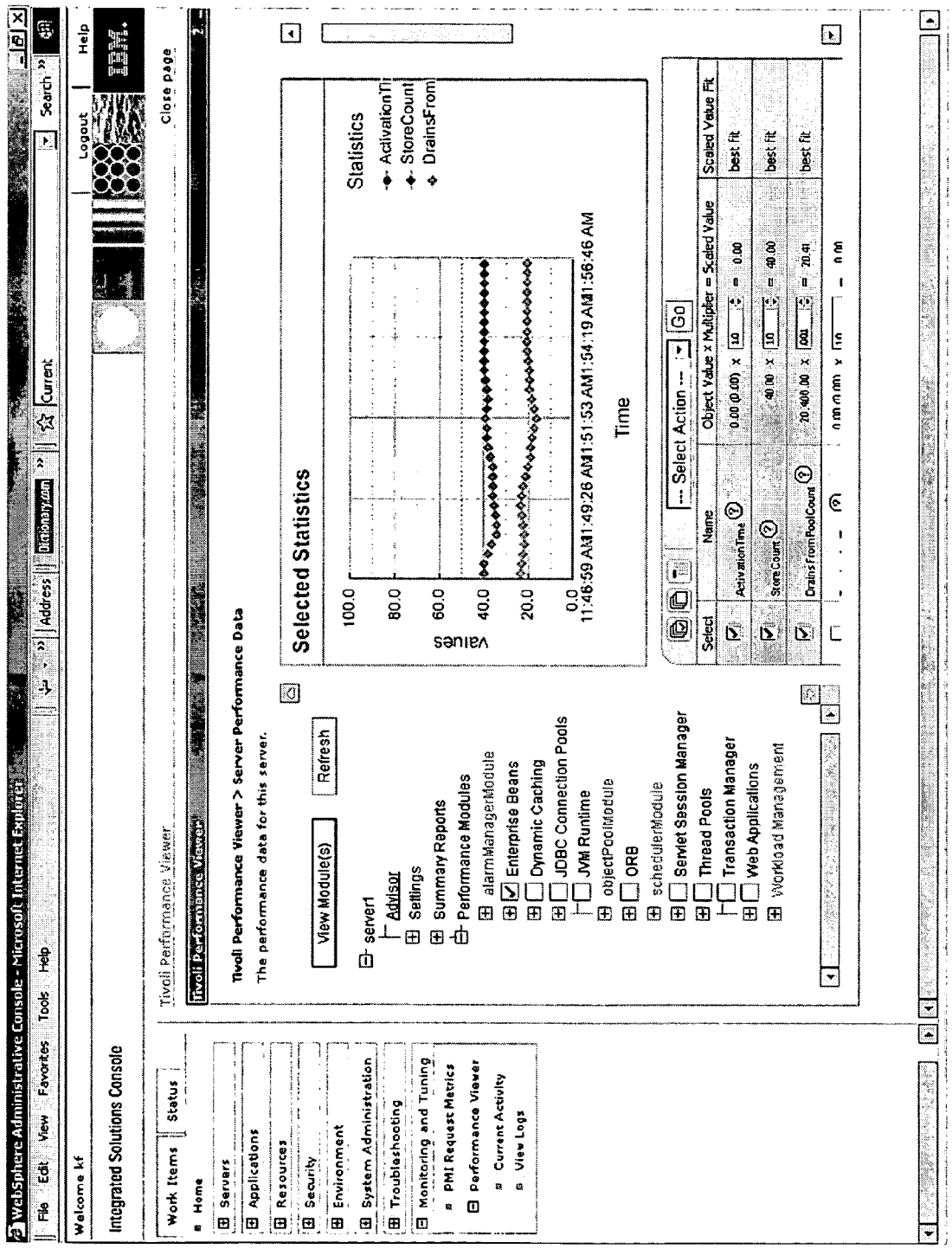
FIG. 6 is a third screen shot of a graph in which the present invention is being employed.

Despite the selection of three metrics to display on the graph 430, only the second is actually displayed at this point because the range of the scaled data points of only the second metric fits within the range of vertical axis 434. The maximum value of the first metric (4.00) is below the range of the minimum value of the vertical axis 434A and is not plotted. The maximum of the third metric (204.10) exceeds the maximum value 434B of the vertical axis 434 and is, therefore, not plotted. Referring now to FIG. 5, the user may change the multiplier of the third metric, such as with a spin button 420. The spin button allows the user to conveniently increment and decrement the multiplier in fixed steps, such as by factors of 10. As illustrated, the user has decremented the multiplier from 0.01 to 0.001, resulting in a (rounded) scaled maximum value for the third data set of 20.41 which now fits within the y-axis values. Subsequently, in FIG. 6, the newly scaled third metric is graphed along with the second metric.

The computer 300 may optionally determine how well the scaled value of a metric fits relative to the y-axis values. As shown in a last column 422 of the second window 410 of FIGS. 4-6, a "fit indicator" is displayed for each metric. If the computer determines that the range of y-values of a metric's data set will fall within the range of the y-axis 434, "best fit" or other comparable indicator is displayed in the last column 422. If the computer determines that the maximum y-value of a metric's data set exceeds the maximum value 434B of the y-axis 434, "exceeds range" or other comparable indicator is displayed in the last column 422. And, if the computer determines that the range of y-values of a metric's data set will fall within the range of the y-axis 434, "insufficient range" or other comparable indicator is displayed in the last column 422.

To determine whether a set of data points triggers the "insufficient range" indicator, a scale is calculated for a best fit; that is, a scale which makes the scaled value closest to the actual (unmultiplied) value and still allows the value to fit within the graph range (0-100 in the Figs.). For better accuracy, the standard deviation of a metric is also taken into account. If the scaled value is calculated to be other than a best fit, the "insufficient range" indicator is displayed. Alternatively, both the scaled value and the standard deviation may be calculated and, if both are less than 1 indicating that a metric's data set will fall below the minimum value 434A of the y-axis 434 and the "insufficient range" indicator will be displayed.

The objects of the invention have been fully realized through the embodiments disclosed herein. Those skilled in the art will realize that the above described invention maybe embodied in a computer program product stored on a computer readable medium. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for displaying data in a graphical format, comprising:
    a) storing graphable data sets, each data set having a plurality of data points, each data point having a first variable value and a second variable value;
    b) displaying a graph outline in a first frame of a display, the graph outline comprising:
        a first axis spanning a range of first axis values representative of the first variable; and
        a second axis spanning a range of second axis values representative of the second variable, dependent upon the first variable;
    c) retrieving a first of the graphical data sets;
    d) selecting a first multiplier to apply to the second variable values of the first data set;
    e) displaying the first multiplier in a second frame of the display;
    f) multiplying each second variable value of the first data set by the first multiplier whereby a multiplied first data set is generated having multiplied second variable values;
    g) determining if all of the multiplied second variable values of the multiplied first data set are within the range of second axis values;
    h) if all of the multiplied second variable values of the multiplied first data set are within the range of second axis values, plotting the multiplied first data set within the graph outline; and
    i) if not all of the multiplied second variable values of the multiplied first data set are within the range of second axis values:
        receiving a user instruction selecting a new multiplier;
        multiplying each second variable value of the first data set by the new multiplier whereby a newly multiplied first data set is generated having newly multiplied second variable values;
        determining if all of the newly multiplied second variable values of the newly multiplied first data set are within the range of second axis values; and
        if all of the newly multiplied second variable values of the newly multiplied first data set are within the range of second axis values. plotting the newly multiplied first data set within the graph outline; and
    i) displaying a fit indicator in the second frame of the display, wherein the fit indicator indicates a relationship between a range of the multiplied second variable values and the range of second axis values.

2. The method of claim 1, further comprising repeating steps c)-ij) for each other of the graphical data sets.

3. The method of claim 1, wherein the fit indicator is selected from the group consisting of: a good fit indicator, a range exceeded indicator, and an insufficient range indicator; wherein the good fit indicator is an indication that the multiplied second variable values to are within the range of second axis values, the range exceeded indicator is an indication that at least one of the multiplied second variables values is greater than the maximum second axis values, and the insufficient range indicator is an indication that at least one of the multiplied second variable values is less than the minimum second axis values.

4. The method of claim 1, wherein selecting the first multiplier comprises a processor-based computation of the first multiplier.

5. The method of claim 1, wherein selecting the first multiplier comprises a user selecting the first multiplier.

6. The method of claim 5, wherein selecting the first multiplier and the new multiplier comprise a user activating a spin button displayed in the second frame of the display.

7. The method of claim 6, wherein activating the spin button selectively increments and decrements the first multiplier by factors of ten.

8. A graphical display system, comprising:
a storage device for storing data sets, each data set having a plurality of data points, each data point having a first variable value and a second variable value;
means for retrieving one of the graphical data sets;
means for selecting a first multiplier to apply to the second variable values of the retrieved data set:
a monitor having a first frame and a second frame;
wherein the first multiplier is displayed in the second frame and a graph outline is displayed in the first frame, the graph outline comprising;
a first axis spanning a range of first axis values representative of the first variable, and
a second axis spanning a range of second axis values representative of the second variable, dependent upon the first variable;
means for multiplying each second variable value of the retrieved data set by the first multiplier whereby a multiplied retrieved data set is generated having multiplied second variable values;
means for determining if all of the multiplied second variable values of the multiplied retrieved data set are within the range of second axis values;
means for plotting the multiplied retrieved data set within the graph outline if all of the multiplied second variable values of the multiplied retrieved data set are within the range of second axis values; and
if not all of the multiplied second variable values of the multiplied retrieved data set are within the range of second axis values:
means for receiving a user instruction selecting a new multiplier;
means for multiplying each second variable value of the retrieved data set by the new multiplier whereby a newly multiplied retrieved data set is generated having newly multiplied second variable values;
means for determining if all of the newly multiplied second variable values of the newly multiplied retrieved data set are within the range of second axis values; and
means for plotting the newly multiplied retrieved data set within the graph outline if all of the newly multiplied second variable values of the newly multiplied retrieved data set are within the range of second axis; and
means for displaying a fit indicator in the second frame of the display, wherein the fit indicator indicates a relationship between a range of the multiplied second variable values and the range of second axis values.

9. The graphical display system of claim 8, wherein the fit indicator is selected from the group consisting of: a good fit indicator, a range exceeded indicator, and an insufficient range indicator; wherein the good fit indicator is an indication that the multiplied second variable values are within the range of second axis values, the range exceeded indicator is an indication that at least one of the multiplied second variables values is greater than the maximum second axis values, and the insufficient range indicator is an indication that at least one of the multiplied second variable values is less than the minimum second axis values.

10. The graphical display system of claim 8, wherein selecting the first multiplier comprises a processor-based computation of the first multiplier.

11. The graphical display system of claim 8, wherein selecting the first multiplier comprises a user selecting the first multiplier.

12. The graphical display system of claim 11, wherein selecting the first multiplier and the new multiplier comprise a user activating a spin button displayed in the second frame of the display.

13. The graphical display system of claim 12, wherein activating the spin button selectively increments and decrements the first multiplier by factors of ten.

14. A computer program product stored on a computer readable medium usable with a programmable computer, the computer program product having computer-readable code embodied therein for displaying data in a graphical format, the computer-readable code comprising instructions for:
a) storing graphable data sets, each data set having a plurality of data points, each data point having a first variable value and a second variable value;
b) displaying a graph outline in a first frame of a display, the graph outline comprising:
a first axis spanning a range of first axis values representative of the first variable; and
a second axis spanning a range of second axis values representative of the second variable, dependent upon the first variable;
c) retrieving a first of the graphical data sets;
d) selecting a first multiplier to apply to the second variable values of the first data set;
e) displaying the first multiplier in a second frame of the display;
f) multiplying each second variable value of the first data set by the first multiplier whereby a multiplied first data set is generated having multiplied second variable values;
g) determining if all of the multiplied second variable values of the multiplied first data set are within the range of second axis values;
h) plotting the multiplied first data set within the graph outline if all of the multiplied second variable values of the multiplied first data set are within the range of second axis values; and
i) if not all of the multiplied second variable values of the multiplied first data set are within the range of second axis values:
receiving a user instruction selecting a new multiplier;
multiplying each second variable value of the first data set by the new multiplier whereby a newly multiplied first data set is generated having newly multiplied second variable values;
determining if all of the newly multiplied second variable values of the newly multiplied first data set are within the range of second axis values; and
plotting the newly multiplied first data set within the graph outline if all if the newly multiplied second variable values of the newly multiplied first data set are within the range of second axis values; and j) displaying a fit indicator in second frame of the display, wherein the fit indicator indicates a relationship between a range of the multiplied second variable values and the range of second axis values.

15. The computer program product of claim 14, further comprising instructions for repeating instructions c)-ij) for each other of the graphical data sets.

16. The computer program product of claim 14, wherein the fit indicator is selected from the group consisting of: a good fit indicator, a range exceeded indicator, and an insufficient range indicator; wherein the good fit indicator is an indication the multiplied second variable values are within the range of second axis values, the range exceeded indicator is an indication that at least one of the multiplied second variables values is greater than the maximum second axis values, and the insufficient range indicator is an indication that at least one of the multiplied second variable values is less than the minimum second axis values.

17. The computer program product of claim 14, wherein the instructions for selecting the first multiplier comprise instructions for a processor-based computation of the first multiplier.

18. The computer program product of claim 14, wherein the instructions for selecting the first multiplier comprise instructions for receiving a user selecting the first multiplier.

19. The computer program product of claim 18, wherein the instructions for selecting the first multiplier and the new multiplier comprise instructions for receiving input from a user-activated spin button displayed in the second frame of the display.

20. The computer program product of claim 19, wherein the instructions for receiving input from the spin button comprise instructions for selectively incrementing and decrementing the first multiplier by factors of ten.

* * * * *